United States Patent
Owada

(10) Patent No.: US 9,230,198 B2
(45) Date of Patent: Jan. 5, 2016

(54) INKJET PRINTER

(71) Applicant: Roland DG Corporation, Hamamatsu-shi, Shizuoka (JP)

(72) Inventor: Koji Owada, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 14/452,628

(22) Filed: Aug. 6, 2014

(65) Prior Publication Data

US 2015/0042705 A1    Feb. 12, 2015

(30) Foreign Application Priority Data

Aug. 7, 2013   (JP) .................................. 2013-164234

(51) Int. Cl.
```
B41J 3/00       (2006.01)
G06K 15/02      (2006.01)
B41J 2/01       (2006.01)
G06K 15/00      (2006.01)
G06K 15/10      (2006.01)
```
(52) U.S. Cl.
CPC ............... *G06K 15/1805* (2013.01); *B41J 2/01* (2013.01); *G06K 15/002* (2013.01); *G06K 15/102* (2013.01)

(58) Field of Classification Search
CPC .......... B41J 3/4073; B41J 2/01; B41J 2/0057; B29C 67/0092; B29C 67/0059
USPC ............................................................ 347/2
See application file for complete search history.

(56) References Cited

U.S. PATENT DOCUMENTS

| | | | |
|---|---|---|---|
| 4,311,399 A * | 1/1982 | Wegryn et al. | 400/76 |
| 5,541,625 A * | 7/1996 | Holstun et al. | 347/5 |
| 2006/0284906 A1* | 12/2006 | Jeong et al. | 347/5 |
| 2007/0247651 A1* | 10/2007 | Maehira | 358/1.12 |
| 2009/0103138 A1* | 4/2009 | Honda | 358/1.18 |
| 2009/0122344 A1* | 5/2009 | Oi et al. | 358/1.15 |
| 2009/0180140 A1* | 7/2009 | Kawamura | 358/1.15 |
| 2011/0149305 A1* | 6/2011 | Fujita et al. | 358/1.5 |
| 2012/0307303 A1* | 12/2012 | Harada | 358/1.15 |
| 2012/0319939 A1* | 12/2012 | Kawashima et al. | 345/156 |
| 2013/0328958 A1* | 12/2013 | Sudo et al. | 347/15 |

FOREIGN PATENT DOCUMENTS

| | | |
|---|---|---|
| JP | 07-329402 A | 12/1995 |
| JP | 2001-027941 A | 1/2001 |

* cited by examiner

*Primary Examiner* — Manish S Shah
*Assistant Examiner* — Yaovi Ameh
(74) *Attorney, Agent, or Firm* — Keating and Bennett, LLP

(57) ABSTRACT

A printer includes a recording head that ejects ink toward a recording medium, a first driving mechanism that moves the recording head in main scanning directions; a second driving mechanism that moves the recording head and the recording medium with respect to each other in sub scanning directions perpendicular to the main scanning directions; an input device that allows a user to input thereto printing information about printing time and image quality; and a control device that controls the recording head, the first driving mechanism and the second driving mechanism based on the printing information input to the input device. The printing information includes at least information about a pass number of the recording head. The input device allows the pass number to be changed continuously.

10 Claims, 4 Drawing Sheets

INKJET PRINTER

The present application claims priority from Japanese Patent Application No. 2013-164234 filed on Aug. 7, 2013, which is incorporated by reference herein in its entirety.

BACKGROUND OF THE INVENTION

1. Field of the Invention

The present invention relates to an inkjet printer.

2. Description of the Related Art

Inkjet printers have characteristics such that a shorter printing time results in a lower image quality and such that realization of a higher image quality requires a longer printing time. Which of the printing time and the image quality should be prioritized varies case by case. Under such circumstances, there are known inkjet printers which are operable in a plurality of printing modes that are different in terms of the printing time and the image quality, so that a user can choose any one of the plurality of printing modes.

For example, printers disclosed in Japanese Laid-Open Patent Publications Nos. Hei 7-329402 and 2001-27941 allow color printing or monochromatic printing to be chosen, and also allow high-precision printing or draft printing to be chosen. Namely, these printers prepare four patterns of printing modes, i.e., color high-precision printing, color draft printing, monochromatic high-precision printing, and monochromatic draft printing. These printers notify the user of the time necessary to perform printing in the chosen printing mode (hereinafter, referred to as the "expected printing time").

However, conventional printers as described above provide a limited number of printing modes, and may not provide a combination of printing time and image quality desired by the user. In addition, the relationship between the printing time and the image quality is not simple. In some cases, the change amount in the image quality caused by a certain change in the printing time varies in accordance with the printing time. Specifically, there are cases where, in a certain range of printing time, the image quality is not reduced much even when the printing time is shortened; whereas in another range of printing time, the image quality is significantly reduced when the printing time is slightly shortened. In some other cases, the change amount in the image quality caused by a certain change in the printing time varies in accordance with the image or the like to be printed (hereinafter, referred to as the "printing object"). For example, when the printing object is a letter or a character, the image quality may not be reduced much even when the printing time is shortened. By contrast, when the printing object is a photograph, the image quality may be significantly reduced when the printing time is slightly shortened. With the conventional printers, there are only fixed combinations of the printing time and the image quality, and the printing time and the image quality cannot be adjusted in accordance with the inherent characteristics of the printing object. Therefore, the conventional printers cannot satisfy the demands of the user.

SUMMARY OF THE INVENTION

Preferred embodiments of the present invention provide an inkjet printer capable of performing printing with a balance of printing time and image quality that is desired by the user.

An inkjet printer according to a preferred embodiment of the present invention includes a recording head, a first driving mechanism, a second driving mechanism, an input device and a control device. The recording head is configured to eject ink toward a recording medium. The first driving mechanism is configured to move the recording head in main scanning directions. The second driving mechanism is configured to move the recording head and the recording medium with respect to each other in sub scanning directions perpendicular to the main scanning directions. The input device is configured to allow a user to input thereto printing information about printing time and image quality. The control device is configured and programmed to control the recording head, the first driving mechanism and the second driving mechanism based on the printing information input to the input device. The printing information includes at least information about a pass number of the recording head. The input device is configured to allow the pass number to be changed continuously.

In the preferred embodiments of the present invention, the "pass number" is the number of times that the recording head passes over a unit area of the recording medium while ejecting ink. An increase in the pass number improves the image quality but extends the printing time.

In an inkjet printer according to a preferred embodiment of the present invention, the input device is configured to allow the pass number to be continuously changed. Therefore, as compared with a conventional printer as described above having a limited number of printing modes, the inkjet printer according to a preferred embodiment of the present invention allows the user to set the printing time and the image quality more precisely in many ways. Thus, the printing is capable of being performed easily with a balance of printing time and image quality that is desired by the user. In addition, even printing objects which are different in terms of the change amount in the image quality caused by a certain change in the printing time are capable of being printed easily with a balance of printing time and image quality that is desired by the user by use of the same printer.

According to a preferred embodiment of the present invention, the printing information includes information about a resolution of printing. The input device is configured to allow the resolution to be changed continuously.

According to the above-described preferred embodiment of the present invention, the printing information that is changeable by the user includes information about the resolution of printing, in addition to the information about the pass number of the recording head. This allows the printing time and the image quality to be set more precisely in many ways. Especially, this allows the user to change the information about the resolution of printing. Therefore, the coarseness of the image quality is capable of being adjusted. Thus, a coarseness of the image quality that is optimal to the user is easily achieved.

According to another preferred embodiment of the present invention, the printing information includes information about a scanning speed, which is a moving speed of the recording head in the main scanning directions. The input device allows the scanning speed to be changed continuously.

According to the above-described preferred embodiment of the present invention, the printing information changeable by the user includes information about the scanning speed, in addition to the information about the pass number of the recording head. This allows the printing time and the image quality to be set more precisely in many ways. Especially, this allows the user to change the information about the scanning speed. Therefore, the entire image quality of printing is capable of being finely adjusted. Thus, an image quality that is optimal to the user is easily achieved.

According to still another preferred embodiment of the present invention, one direction among the main scanning directions is a forth direction and the other direction opposite to the one direction among the main scanning directions is a return direction. The control device is configured and programmed to perform unidirectional printing in which the ink is ejected from the recording head while the recording head is moving in the forth direction, and bidirectional printing in which the ink is ejected from the recording head both while the recording head is moving in the forth direction and while the recording head is moving in the return direction. The printing information includes information about the unidirectional printing and the bidirectional printing. The input device is configured to allow the unidirectional printing to be switched to the bidirectional printing and allows the bidirectional printing to be switched to the unidirectional printing.

According to the above-described preferred embodiment of the present invention, the printing information that is changeable by the user includes information about the unidirectional printing and the bidirectional printing, in addition to the information about the pass number of the recording head. This allows the printing time to be set more precisely in many ways. Therefore, a desired printing time that is optimal to the user is easily provided. The bidirectional printing may take less time in printing when compared to the printing time that the unidirectional printing may take.

According to still another preferred embodiment of the present invention, the control device is configured and programmed to include a receiving section, an image generation section, and an image display section. The receiving section is configured to receive the printing information input to the input device. The image generation section is configured to generate a printing preview image based on the printing information received by the receiving section. The image display section is configured to display the printing preview image, generated by the image generation section, on a display device.

According to the above-described preferred embodiment of the present invention, the user is able to check the image quality of printing by viewing the printing preview image. The user is able to set the image quality of printing while viewing the printing preview image. Thus, a desired quality image of printing that is optimal to the user is easily provided. Re-printing, which would be required when the desired quality image of printing optimal to the user is not provided, is avoided. This prevents wasteful use of ink.

According to still another preferred embodiment of the present invention, the control device is configured and programmed to include a printing time calculation section and a printing time display section. The printing time calculation section is configured to calculate the printing time necessary to perform printing on the recording medium based on the printing information input to the input device. The printing time display section is configured to display the printing time, calculated by the printing time calculation section, on the display device.

According to the above-described preferred embodiment of the present invention, the user is informed of the time necessary for the printing before the printing is started. The user is able to input the printing information while viewing the printing time displayed on the display device. Therefore, a desired printing time that is optimal to the user is easily set.

According to still another preferred embodiment of the present invention, the input device is configured to allow the user to input a change in the printing information during the printing performed on the recording medium by the recording head. When the change in the printing information is input to the input device, the control device is configured and programmed to control the recording head, the first driving mechanism and the second driving mechanism based on the post-change printing information.

According to the above-described preferred embodiment of the present invention, the user is able to change the input data of the printing information during printing. Even during printing, the control device changes the printing time or the image quality based on the post-change data of the printing information. If the printing time and/or the image quality is not optimal to the user, the input data of the printing information is capable of being changed during the printing. Therefore, it is not necessary to re-perform the printing from the beginning.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, an inkjet printer (hereinafter, referred to simply as a "printer") according to various preferred embodiments according to the present invention will be described. The present invention is not limited to the preferred embodiments described below, as a matter of course. Members and portions having the same function will be bear the same reference signs, and the same descriptions will be omitted or simplified.

Figure 1:
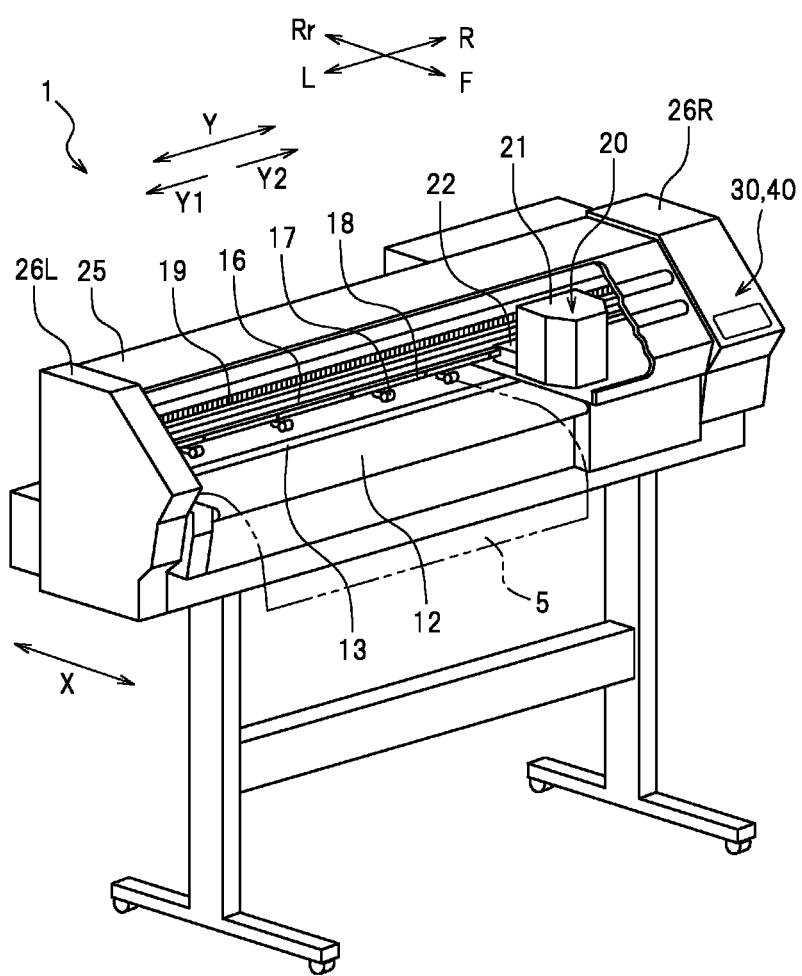
FIG. 1 is an isometric view showing a printer with a portion thereof being cut off.

FIG. 1 is an isometric view showing a printer 1 in this preferred embodiment with a portion thereof being cut off. In FIG. 1, reference signs F, Rr, L and R respectively represent forward, rearward, leftward and rightward. In FIG. 1, reference sign Y represents main scanning directions. Reference sign Y1 represents one direction among the main scanning directions. Herein, the direction represented by Y1 will be referred to as a "forth direction". Reference sign Y2 represents the other direction opposite to the forth direction among the main scanning directions. Herein, the direction represented by Y2 will be referred to as a "return direction". In this preferred embodiment, the forth direction Y1 is the direction from right to left, and the return direction Y2 is the direction from left to right. These directions may be opposite to the above. In FIG. 1, reference sign X represents sub scanning directions perpendicular to the main scanning directions Y. It should be noted that there is no specific limitation on the main scanning directions Y or the sub scanning directions X. The main scanning directions Y and the sub scanning directions X may be appropriately set in accordance with the form of the printer or the like.

The printer 1 in this preferred embodiment preferably is not a home-use printer but is a so-called business-use printer. As shown in FIG. 1, the printer 1 performs printing on recording paper 5. Herein, the recording paper 5 corresponds to a recording medium. The recording paper 5 preferably is a roll-type recording medium. The recording paper 5 is so-called roll paper. The recording medium of the present invention is not limited to the recording paper 5. For example, the recording medium may be a resin sheet. The recording medium is not limited to a flexible sheet. The recording medium may be formed of a hard material such as, for example, glass.

In this preferred embodiment, the printer 1 includes a platen 12 that supports the recording paper 5. The platen 12 is provided with a cylindrical grid roller 13. The grid roller 13 is embedded in the platen 12 with a top surface thereof being exposed. The grid roller 13 is drivable by a feed motor (not shown). The grid roller 13 is an example of feeding mechanism that moves the recording paper 5 in the sub scanning directions X.

Above the platen 12, a guide rail 16 is located. The guide rail 16 is located parallel or substantially parallel to the platen 12. The guide rail 16 extends in a left-right direction. Below the guide rail 16, a plurality of pinch rollers 17 are located at equal or approximately equal intervals. The pinch rollers 17 face the grid roller 13. The positions of the pinch rollers 17 in an up-down direction are preferably set in accordance with the thickness of the recording paper 5. The recording paper 5 is inserted between the pinch rollers 17 and the grid roller 13. The grid roller 13 and the pinch rollers 17 are configured to transfer the recording paper 5 in the sub scanning directions X while pinching the recording paper 5. The guild rail 16 includes an engaging portion 18 projecting forward.

The printer 1 also includes a recording head 20. The recording head 20 is configured to eject ink toward the recording paper 5. The recording head 20 is configured to execute printing by ejecting ink toward the recording paper 5 while moving in the forth direction Y1 (hereinafter, referred to as the "unidirectional printing"), and also can execute printing by ejecting ink toward the recording paper 5 both while moving in the forth direction Y1 and while moving in the return direction Y2 (hereinafter, referred to as the "bidirectional printing"). Herein, the recording head 20 is accommodated in a case 21.

A carriage 22 is provided on a rear surface of the case 21. A rear end portion of the carriage 22 has a recessed portion that is recessed forward. The recessed portion is engaged with the engaging portion 18 of the guide rail 16. The carriage 22 is slidable along the guide rail 16. The carriage 22 is movable in the main scanning directions Y. The recording head 20 is guided in the main scanning directions Y by the guide rail 16 via the carriage 22.

To a top portion of the rear surface of the case 21, a portion of a driving belt 19 extending in the left-right direction is fixed. The driving belt 19 is connected to a scan motor (not shown). The driving belt 19 is drivable by the scan motor. The recording head 20 is drivable by the scan motor via the driving belt 19.

Above the recording head 20, a top cover 25 is provided. The top cover 25 defines a top housing of the printer 1. To both of two sides of the top cover 25, side covers 26L and 26R are provided.

Figure 2:
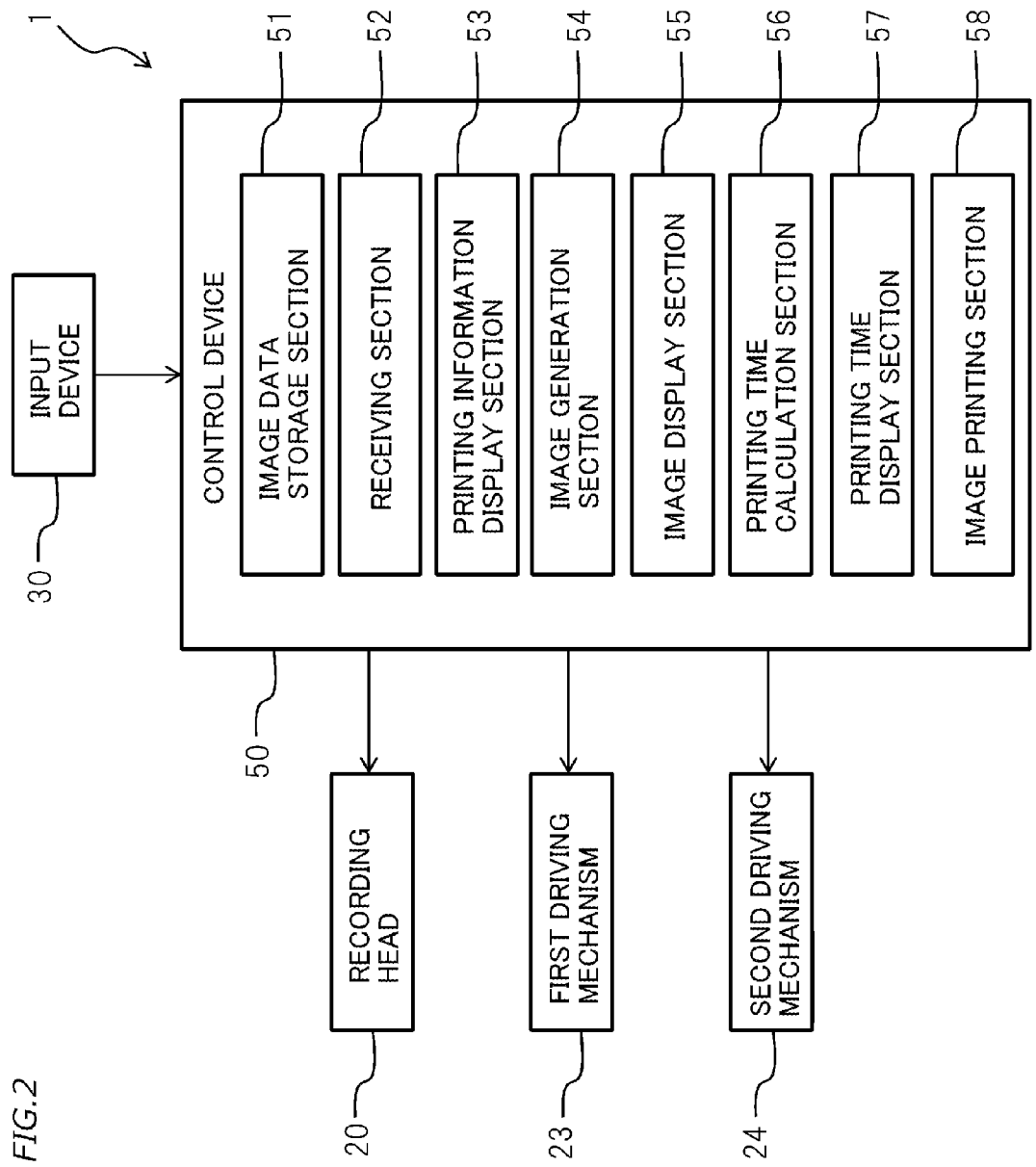
FIG. 2 is a block diagram showing a portion of elements of the printer.

FIG. 2 is a block diagram showing a portion of elements of the printer 1. The printer 1 includes a first driving mechanism 23 and a second driving mechanism 24. The first driving mechanism 23 is configured to move the recording head 20 in the main scanning directions Y (see FIG. 1). In this preferred embodiment, the first driving mechanism 23 includes the driving belt 19 and the scan motor that drives the driving belt 19. The second driving mechanism 24 is configured to move the recording head 20 and the recording paper 5 with respect to each other in the sub scanning directions X (see FIG. 1). In this preferred embodiment, the second driving mechanism 24 includes the grid roller 13, the feed motor that drives the grid roller 13, and the pinch rollers 17. The first driving mechanism 23 and the second driving mechanism 24 are not limited to having any specific structure, and may include, for example, a device that moves a table having the recording medium placed thereon in a front-rear direction and also in the left-right direction.

Figure 3:
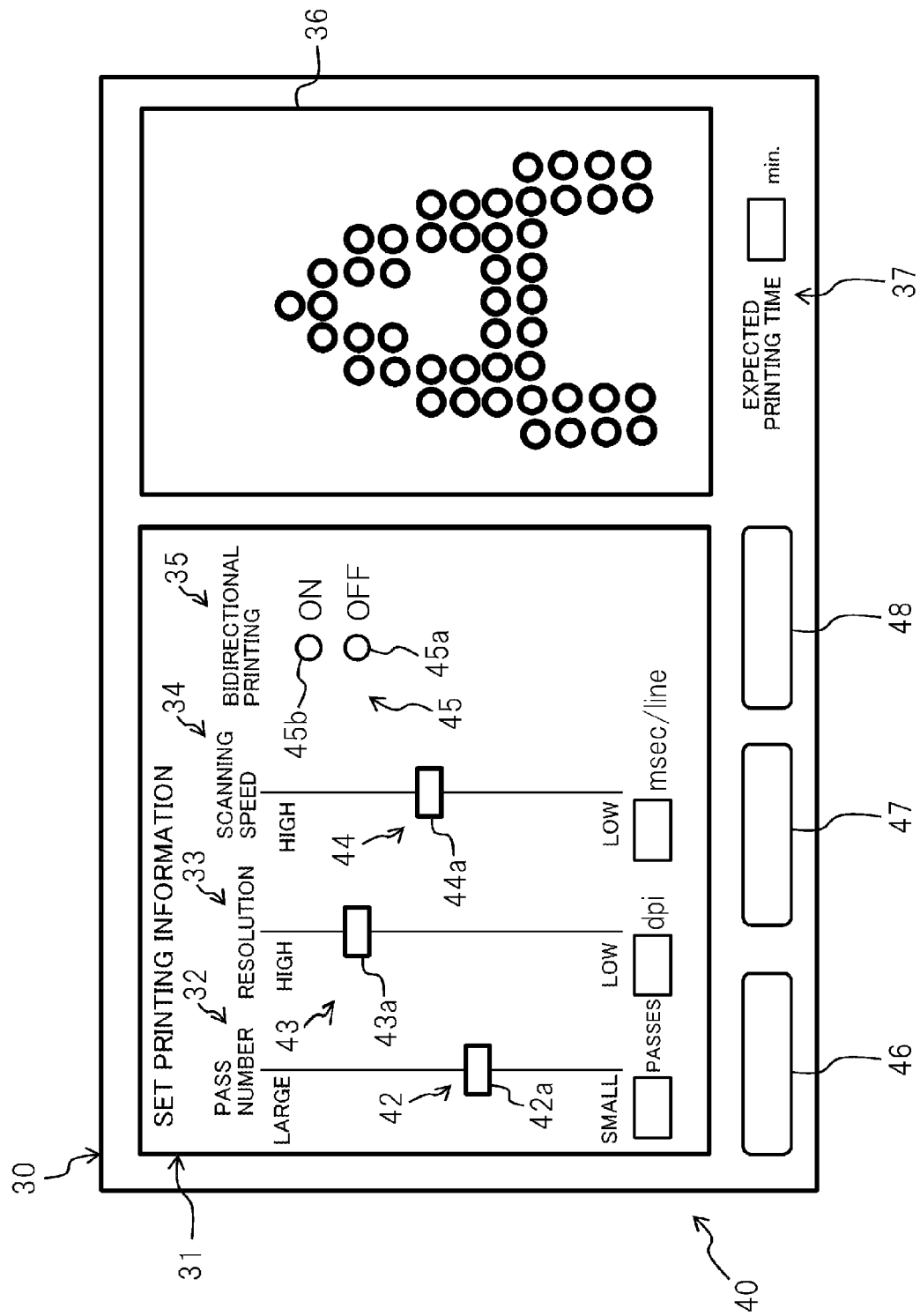
FIG. 3 shows an input device.

In this preferred embodiment, the printer 1 includes an input device 30 and a control device 50. Herein, as shown in FIG. 1, the input device 30 is provided on a front surface of the side cover 26R. FIG. 3 shows the input device 30. The input device 30 is configured to allow printing information 31 to be input thereto by a user. The printing information 31 includes information about printing time and image quality.

In this preferred embodiment, the printing information 31 preferably includes four pieces of information 32 through 35, for example. Specifically, the printing information 31 includes information 32 on a pass number of the recording head 20 (hereinafter, referred to as the "pass number information 32"), information 33 on a resolution of printing (hereinafter, referred to as the "resolution information 33"), information 34 on a scanning speed of the recording head 20 (hereinafter, referred to as the "scanning speed information 34"), and information 35 on whether the unidirectional printing or the bidirectional printing is to be performed (hereinafter, referred to as the "bidirectional printing information 35").

The pass number information 32 is information about the number of times the recording head 20 passes over the unit area of the recording paper 5 while ejecting ink. An increase in the pass number improves the image quality of printing but extends the printing time. The pass number information 32 preferably is used to mainly adjust the stripe unevenness of printing. The resolution information 33 represents, by density, how precisely a printing object is printed in a certain area size. When the number of dots per unit area size is increased, the resolution is increased. An increase in the resolution (in other words, an increase in the resolution value) improves the image quality of printing but extends the printing time. The resolution information 33 preferably is used to mainly adjust the roughness of the image quality of printing. The scanning speed information 34 is information about the moving speed of the recording head 20 in the main scanning directions Y. An increase in the scanning speed reduces the image quality of printing but shortens the printing time. The scanning speed information 34 preferably is used to mainly adjust the clarity of printing. The bidirectional printing information 35 represents whether the printing on the recording paper 5 is to be performed by the unidirectional printing or the bidirectional printing. Choosing the bidirectional printing shortens the printing time. The bidirectional printing information 35 preferably is used to mainly adjust the clarity of printing. In this preferred embodiment, the image quality of printing preferably is determined by the pass number information 32, the resolution information 33, the scanning speed information 34 and the bidirectional printing information 35.

In this preferred embodiment, the input device 30 includes a display screen 40. The display screen 40 corresponds to a display device. Herein, a surface of the display screen 40 is a touch panel. The user is able to input the pass number information 32, the resolution information 33, the scanning speed information 34 and the bidirectional printing information 35 by operating the touch panel before starting the printing on the recording paper 5.

In this preferred embodiment, the display screen 40 of the input device 30 has operation portions by which the user is able to input the information 32 through 35. Specifically, the display screen 40 is configured to display a slider control 42 that is usable to set the pass number information 32, a slider control 43 that is usable to set the resolution information 33, a slider control 44 that is usable to set the scanning speed information 34, and radio buttons 45 that are usable to set the bidirectional printing information 35.

The user drags tabs 42a through 44a of the slider controls 42 through 44 on the display screen 40. This operation changes the values of the information 32 through 34 in the printing information 31. Herein, when the tabs 42a through 44a are dragged upward on the display screen 40, the values of the information 32 through 34 in the printing information 31 are increased. When the tabs 42a through 44a are dragged downward on the display screen 40, the values of the information 32 through 34 in the printing information 31 are decreased. The input device 30 allows the value of each of the pass number information 32, the resolution information 33 and the scanning speed information 34 to be continuously changed by use of each of the slider controls 42 through 44. In this preferred embodiment, the input device 30 is configured to allow the pass number of the pass number information 32 and the resolution (dpi) of the resolution information 33 to be changed continuously at an interval of 1; namely, allows any integer to be input as the pass number of the pass number information 32 or as the resolution (dpi) of the resolution information 33. As the scanning speed (msec./line) of the scanning speed information 34 also, any integer can be input. Alternatively, the pass number, the resolution and the scanning speed may be changeable at an interval of a predetermined numerical value. For example, the input device 30 may allow the pass number of the pass number information 32 to be changed continuously at an interval of 2. The input device 30 may allow the pass number of the pass number information 32 to be changed continuously at an interval of about 0.5, for example. The input device 30 may allow the pass number of the pass number information 32 to be changed randomly. The unit of the resolution is not limited to dpi. The unit of the scanning speed is not limited to msec./line.

The radio buttons 45 for the bidirectional printing information 45 include an OFF button 45a and an ON button 45b. The OFF button 45a corresponds to the unidirectional printing. The ON button 45b corresponds to the bidirectional printing. Hereinafter, the OFF button 45a will be referred to as the "unidirectional printing button 45a". The ON button 45b will be referred to as the "bidirectional printing button 45b". When the unidirectional printing button 45a is chosen, the unidirectional printing is set. By contrast, when the bidirectional printing button 45b is chosen, the bidirectional printing is set. Thus, in this preferred embodiment, the input device 30 allows the unidirectional printing to be switched to the bidirectional printing, and also allows the bidirectional printing to be switched to the unidirectional printing, by use of the radio buttons 45 for the bidirectional printing information 35.

On the display screen 40 of the input device 30, a printing preview image 36 and an expected printing time 37 are displayed. The printing preview image 36 is an image that shows how the printing object will be printed before the printing object is actually printed on the recording paper 5. Herein, the printing preview image 36 is an image that will be actually printed on the recording paper 5. Thus, the user is able to check how the printing object will be actually printed while inputting the information 32 through 35 in the printing information 31 by operating the tabs 42a through 44a and the radio button 45.

Alternatively, the printing preview image 36 may be a sample image. In this case, the input device 30 may include a choose button (not shown) by which the type of image can be chosen. The type of image is, for example, a photograph, an illustration or a letter or a character. The user chooses the type of image to be printed by use of the choose button. A sample image of the chosen type is shown as the printing preview image 36. This allows the user to input the information 32 through 35 in the printing information 31 while checking if the image quality is suitable to the selected type of image.

Which of the "stripe unevenness", "roughness" and "clarity" of the image quality is to be prioritized varies in accordance with the type of image. For example, in the case where the image is a photograph, the "roughness" has the highest priority and the "stripe unevenness" has the lowest priority. In the case where the image is an illustration, the "stripe unevenness" has the highest priority, and the "clarity" has the lowest priority. Therefore, in this preferred embodiment, the change amounts in the values of the pass number information 32, the resolution information 33 and the scanning speed information 34 with respect to the operation amounts on the tabs 42a through 44a for the information 32 through 34 may be optionally varied in accordance with the chosen type of image. For example, in the case where the photograph is chosen as the type of image, the "roughness" of the image quality has the highest priority. Therefore, in the case where the photograph is chosen as the type of image, the change amount in the value of the resolution information 33 with respect to the operation amount on the tab 43a for the resolution information 33 is preferably made larger than in the case where the illustration is chosen as the type of image. In the case where the illustration is chosen as the type of image, the "stripe unevenness" has the highest priority. Therefore, in the case where the illustration is chosen as the type of image, the change amount in the value of the pass number information 32 with respect to the operation amount on the tab 42a for the pass number information 32 preferably is made larger than in the case where the photograph is chosen as the type of image. In this manner, an image quality suitable to the chosen type of image is provided easily and certainly.

The expected printing time 37 is a time necessary to print the printing object on the recording paper 5. The printing preview image 36 and the expected printing time 37 vary in accordance with a change in the pass number information 32, the resolution information 33, the scanning speed information 34 or the bidirectional printing information 35. The user is able to determine the image quality of printing by viewing the printing preview image 36. The user is able to determine the printing time by viewing the expected printing time 37. The display screen 40 may display an item or the like that specifies other information (e.g., darkness of color, type of color, etc.).

The display screen 40 preferably is configured to display a virtual button. For example, the display screen 40 preferably is configured to display a printing preview display button 46, a printing start button 47 and a cancel button 48. The printing preview display button 46 is usable to display the printing preview image 36. The printing start button 47 is configured to be used to start the printing on the recording paper 5. The cancel button 48 is preferably configured to cancel the printing on the recording paper 5. When any of these buttons is pressed on the display screen 40, the input device 30 transmits information that is input by the press on the button and/or information about the printing information 31 to the control device 50.

Now, the control device 50 will be described. In this preferred embodiment, the control device 50 preferably includes a microcomputer. The control device 50 preferably is provided inside the printer 1. As shown in FIG. 2, the control device 50 is electrically connected to the first driving mechanism 23, the second driving mechanism 24 and the input device 30. The control device 50 is configured and programmed to include an image data storage section 51, a receiving section 52, a printing information display section 53, an image generation section 54, an image display section 55, a printing time calculation section 56, a printing time display section 57, and an image printing section 58.

The image data storage section 51 is configured to store image data on a printing object to be printed on the recording paper 5. Herein, the image data storage section 51 is provided inside the printer 1. Alternatively, the image data storage section 51 may be provided on a personal computer or the like that is communicable with the printer 1 wirelessly or in a wired manner.

The receiving section 52 is configured to receive the printing information 31 input to the input device 30. In this preferred embodiment, each time input data of any of the information 32 through 35 is changed by use of the corresponding slider control among the slider controls 42 through 44 or one of the radio buttons 45 displayed on the display screen 40, the receiving section 52 receives the post-change data of the printing information 31. The receiving section 52 receives the information 32 through 35 in the printing information 31 at the timing when the printing preview display button 46 or the printing start button 47 displayed on the display screen 40 is pressed.

The printing information display section 53 is configured to display the printing information 31, input to the input device 30, on the display screen 40. Specifically, when any one of the slider controls 42 through 44 usable to change the values of the pass number information 32, the resolution information 33 and the scanning speed information 34, or one of the radio buttons 45 for the bidirectional printing information 35, is operated, the printing information display section 53 displays the post-change data of the corresponding information about the display screen 40.

The image generation section 54 is configured to generate the printing preview image 36 based on the printing information 31 received by the receiving section 52. In this preferred embodiment, the image generation section 54 has a calculation expression, usable to generate the printing preview image 36, prepared in advance. When the user presses the printing preview display button 46 on the display screen 40, the image generation section 54 quantifies the image data of the printing object stored on the image storage section 51, and the data of the pass number information 32, the resolution information 33, the scanning speed information 34 and the bidirectional printing information 35 in the printing information 31. Then, the image generation section 54 substitutes such data for the calculation expression. The image generation section 54 generates the printing preview image 36 by use of the calculation expression. The measure used by the image generation section 54 to generate the printing preview image 36 is not limited to the calculation expression. For example, the image generation section 54 may include maps, usable to generate the printing preview image 36, prepared in advance. In this case, the image generation section 54 may generate the printing preview image 36 by use of the maps and the information 32 through 35 in the printing information 31. The image display section 55 is configured to display the printing preview image 36, generated by the image generation section 54, on the display screen 40 of the input device 30.

The printing time calculation section 56 is configured to calculate the printing time necessary to perform the printing on the recording paper 5 based on the printing information 31 input to the input device 30 (hereinafter, such printing time will be referred to also as the "expected printing time 37"). In this preferred embodiment, the printing time calculation section 56 has a calculation expression, usable to calculate the expected printing time 37, prepared in advance. When the user changes the input data of any of the information 32 through 35 in the printing information 31 by use of the input device 30, the printing time calculation section 56 quantifies the data of the pass number information 32, the resolution information 33, the scanning speed information 34 and the bidirectional printing information 35 in the printing information 31, and then substitutes such data for the calculation expression. The printing time calculation section 56 is configured to calculate the expected printing time 37 by use of the calculation expression. The measure used by the printing time calculation section 56 to calculate the expected printing time 37 is not limited to the calculation expression. For example, the printing time calculation section 56 may include maps, usable to calculate the expected printing time 37, prepared in advance. In this case, the printing time calculation section 56 may calculate the expected printing time 37 by use of the maps and the information 32 through 35 in the printing information 31. The printing time display section 57 is configured to display the expected printing time 37, calculated by the printing time calculation section 56, on the display screen 40 of the input device 30.

The image printing section 58 is configured to control the recording head 20, the first driving mechanism 23 and the second driving mechanism 24 based on the printing information 31 input to the input device 30 and prints the printing object on the recording paper 5. The image printing section 58 can perform both of the unidirectional printing and the bidirectional printing. Whether the image printing section 58 is to perform the unidirectional printing or the bidirectional printing is determined based on the bidirectional printing information 35. In this preferred embodiment, when the user presses the printing start button 47 on the display screen 40, the image printing section 58 reads image data, regarding the printing object to be printed, which is stored on the image data storage section 51, and starts the printing on the recording paper 5. In this process, the image printing section 58 controls the timing or the amount with which the ink is ejected toward the recording paper 5 by the recording head 20 based on the information 32 through 35 in the printing information 31. The image printing section 58 also controls, for example, the speed at which the first driving mechanism 23 moves the recording head 20 in the main scanning directions Y, and the timing at which the second driving mechanism 24 moves the recording paper 5 in the sub scanning directions X, based on the information 32 through 35 in the printing information 31.

So far, the structure of the printer 1 has been described.

Now, a non-limiting example of a procedure of printing the printing object on the recording paper 5 by use of the printer 1 according to a preferred embodiment of the present invention will be briefly described. First, as shown in FIG. 1, the user sets the recording paper 5 on the printer 1. As shown in FIG. 3, the user operates the tabs 42a through 44a of the slider controls 42 through 44 and the radio buttons 45 displayed on the display screen 40 of the input device 30 to input the pass number information 32, the resolution information 33, the scanning speed information 34 and the bidirectional printing information 35 in the printing information 31. When the input data of the information 32 through 35 in the printing information 31 is thus changed, the receiving section 52 of the control device 50 receives the post-change data of the information 32 through 35. The printing time calculation section 56 calculates the expected printing time 37 based on the information 32 through 35 in the printing information 31 received by the receiving section 52. The printing time display section 57 displays the expected printing time 37, calculated by the printing time calculation section 56, on the display screen 40.

Next, the user presses the printing preview display button 46 on the display screen 40. At this point, the receiving section 52 of the control device 50 receives the input data of the information 32 through 35 in the printing information 31. The image generation section 54 generates the printing preview image based on the information 32 through 35 in the printing information 31 received by the receiving section 52. The image display section 55 displays the printing preview image 36, generated by the image generation section 54, on the display screen 40. The user views the printing preview image 36 and the expected printing time 37. When the image quality and/or the printing time is not desirable to the user, the user optionally changes the information 32 through 35 in the printing information 31 again. When both of the image quality and the printing time are desirable to the user, the user presses the printing start button 47 displayed on the display screen 40 of the input device 30.

When the printing start button 47 is pressed, the image printing section 58 of the control device 50 reads the image data, regarding the printing object to be printed, which is stored on the image data storage section 51. The image printing section 58 starts the printing on the recording paper 5. In this process, the image printing section 58 controls, for example, the timing or the amount with which the ink is ejected toward the recording paper 5 by the recording head 20 based on the information 32 through 35 in the printing information 31. The image printing section 58 also controls the speed at which the first driving mechanism 23 moves the recording head 20 in the main scanning directions Y, and the speed at which the second driving mechanism 24 moves the recording paper 5 in the sub scanning directions X, based on the information 32 through 35 in the printing information 31. In this manner, the printing object is printed on the recording paper 5 with the printing time and the image quality based on the information 32 through 35 in the printing information input by the user.

In this preferred embodiment, the input device 30 allows the user to change the input data of the printing information 31 while the printing is performed on the recording paper 5 by the recording head 20. In other words, even during the printing on the recording paper 5, the user can operate any of the tabs 42a through 44a of the slider controls 42 through 44 or one of the radio buttons 45 displayed on the display screen 40 to change the corresponding information among the pass number information 32, the resolution information 33, the scanning speed information 34 and the bidirectional printing information 35 in the printing information 31. Herein, after the printing on the recording paper 5 is started, the printing start button 47 on the display screen 40 is changed to a printing information change button 47. The user changes any of the information 32 through 35 and then presses the printing information change button 47. In this process, when the change in the printing information 31 is input to the input device 30, the image printing section 58 of the control device 50 controls the recording head 20, the first driving mechanism 23 and the second driving mechanism 24 based on the post-change data of the information 32 through 35 in the printing information 31 even during the printing on the recording paper 5.

In this manner, the user is able to change the input data of the printing information 31 during the printing. Even during the printing, the printing time or the image quality is able to be changed based on the post-change data of the printing information 31. If the printing time and/or the image quality is not optimal for the user, the input data of the printing information 31 is capable of being changed during the printing. Therefore, it is not necessary to re-perform the printing from the beginning.

As described above, in this preferred embodiment, the printer 1 includes the input device 30 to which the printing information 31 on the printing time and the image quality is input by the user. The printing information 31 preferably includes the pass number information 32, the resolution information 33, the scanning speed information 34 and the bidirectional printing information 35. The input device 30 allows each of the pass number information 32, the resolution information 33, the scanning speed information 34 and the bidirectional printing information 35 to be continuously changed.

Figure 4:
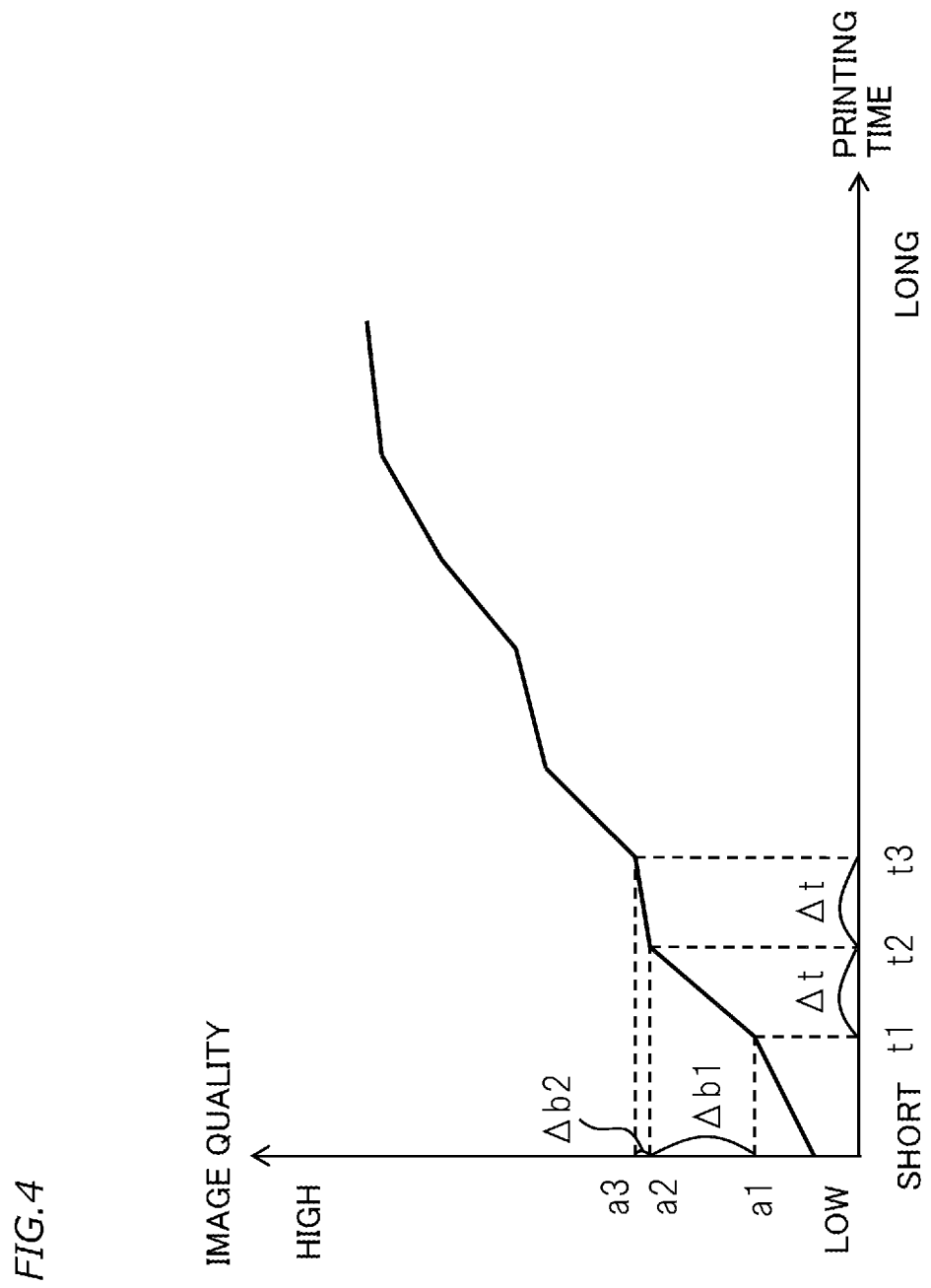
FIG. 4 is a graph showing an example of relationship between the printing time and the image quality.

Generally with inkjet printers, the relationship between the printing time and the image quality is not simple. FIG. 4 is a graph showing an example of relationship between the printing time and the image quality. As shown in FIG. 4, with a general printer, the change amount in the image quality caused by a certain change in the printing time may be different among ranges of printing time. For example, when the printing time is changed from time t1 to time t2, namely, is extended by change amount $\Delta t$, the image quality is changed from image quality a1 to image quality a2. The change amount in the image quality is $\Delta b1$. By contrast, when the printing time is changed from time t2 to time t3, namely, is extended by the change amount $\Delta t$, the image quality is changed from image quality a2 to image quality a3. The change amount in the image quality is $\Delta b2$. $\Delta b2$ is smaller than $\Delta b1$. As can be seen, in a certain range of printing time, i.e., the range from t2 to t3, the image quality is not reduced much even when the printing time is shortened much. By contrast, in another range of printing time, i.e., the range from t1 to t2, the image quality may be significantly reduced even when the printing time is slightly shortened. Also depending on the type of the printing object to be printed, the change amount in the image quality caused by a certain change in the printing time may be varied. For example, in the case where the printing object is a letter or a character, the image quality is not reduced much even when the printing time is shortened much. In the case where the printing object is a photograph, the image quality may be significantly reduced even when the printing time is slightly shortened.

In this preferred embodiment, the user is able to independently change the pass number information 32, the resolution information 33, the scanning speed information 34 and the bidirectional printing information 35 in the printing information 31. The pass number information 32, the resolution information 33 and the scanning speed information 34 are capable of being changed continuously. Therefore, as compared with a conventional printer having a limited number of printing modes, the printer according to various preferred embodiments of the present invention allows the printing time and the image quality to be set more precisely in many ways. Thus, in a range of printing time in which the image quality is not reduced much even when the printing time is shortened (in FIG. 4, for example, the range from t2 to t3), the printing time is capable of being easily shortened without unexpectedly reducing the image quality. Therefore, the printing is performed easily with a balance of printing time and image quality that is desired by the user. In addition, even other printing objects having the change amounts in the image quality caused by a certain change in the printing time are different are printed easily with a balance of printing time and image quality that is desired by the user by use of the same printer 1.

Specifically, the pass number information 32 is changeable. Therefore, the stripe unevenness of printing is finely adjustable. This allows the printing time to be shortened while the stripe unevenness is suppressed within an acceptable range to the user. The resolution information 33 is changeable. Therefore, the coarseness and the roughness of the image quality are capable of being finely adjusted. This allows the printing time to be shortened while the coarseness and the roughness are suppressed within an acceptable range to the user. The scanning speed information 34 is changeable. Therefore, the entire image quality of printing is capable of being finely adjusted. The clarity of the image is capable of being adjusted by use of the scanning speed information 34 and the bidirectional printing information 35. In this preferred embodiment, the image quality of printing preferably is determined by the pass number information 32, the resolution information 33, the scanning speed information 34 and the bidirectional printing information 35. Therefore, the printing preferably is performed at a desired balance of printing time and image quality that is optimal to the user.

A business-use printer as the printer 1 in this preferred embodiment requires a long time for one cycle of printing. Therefore, the effect of shortening the printing time is more significant than for a home-use printer. In this preferred embodiment, the user is able to set the printing time and the image quality precisely. This easily allows the printing time to be shortened without much reducing the image quality. The printer 1 in this preferred embodiment is especially useful as a business-use printer, for example.

In this preferred embodiment, as shown in FIG. 2, the control device 50 is configured and programmed to include the receiving section 52 that receives the printing information 31 input to the input device 30, the image generation section 54 that generates the printing preview image 36 based on the printing information 31 received by the receiving section 52, and the image display section 55 that displays the printing preview image 36, generated by the image generation section 54, on the display screen 40. This structure allows the user to check the image quality of printing in advance by viewing the printing preview image 36. The user is able to set the image quality of printing while viewing the printing preview image 36. Thus, a desired quality image of printing that is optimal to the user is easily provided. Re-printing, which would be required when the desired quality image of printing optimal to the user is not provided, is thus avoided. This prevents wasteful use of ink.

In this preferred embodiment, the control device 50 preferably is configured and programmed to include the printing time calculation section 56 configured to calculate the expected printing time 37 necessary for the printing on the recording paper 5 based on the printing information 31 input to the input device 30, and the printing time display section 57 configured to display the expected printing time 37, calculated by the printing time calculation section 56, on the display screen 40. This allows the user to the learn the expected printing time 37 before the printing is started. The user is able to input the printing information 31 while viewing the expected printing time 37. Therefore, a desired printing time that is optimal to the user is easily set. The user is able to optionally change the information 32 through 35 while viewing the printing preview image 36 and the expected printing time 37, and thus obtains a desired combination of printing time and image quality that is optimal to him/her.

So far, preferred embodiments of the present invention have been described. The above preferred embodiments are merely examples, and the present invention can be carried out in various other preferred embodiments.

For example, in the above-described preferred embodiment, as shown in FIG. 1, the input device 30 preferably is provided on the front surface of the side cover 26R of the printer 1. The input device 30 preferably is integrated with a printer main body (portion of the printer 1 other than the input device 30). According to another preferred embodiment of the present invention, the input device may be separate from the printer main body. For example, the input device may be a personal computer. The input device may be communicable with the control device of the printer main body wirelessly or in a wired manner. In this case, the printing information may be input by use of a keyboard and a mouse of the personal computer.

In the above-described preferred embodiment, as shown in FIG. 3, the printing information 31 preferably includes the pass number information 32, the resolution information 33, the scanning speed information 34 and the bidirectional printing information 35. However, the printing information 31 preferably needs to include at least the pass number information 32 only; and the resolution information 33, the scanning speed information 34 and the bidirectional printing information 35 may be omitted. The printing information 31 may include information other than the information 32 through 35. For example, the printing information may include information about whether color printing or monochromatic printing is to be performed.

In the above-described preferred embodiments, values of the pass number information 32, the resolution information 33 and the scanning speed information 34 in the printing information 31 preferably are input to the input device 30 by operations made on the slide controls 42 through 44, respectively. Alternatively, the display screen 40 may display text boxes usable to set the information 32 through 34 in the printing information 31. In this case, the input device 30 may allow the user to directly input values to the text boxes and thus to input the information 32 through 34 in the printed information 31.

In the above-described preferred embodiments, inputs to the input device 30 preferably are performed by use of the touch panel of the display screen 40. Alternatively, inputs to the input device 30 may be performed by operating various buttons, usable to input values of the information 32 through 35 in the printing information 31, which are physically located around the display screen 40. In this case, the user operates the buttons to input values of the information 32 through 35 in the printing information 31.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inkjet printer, comprising:
   a recording head configured to eject ink toward a recording medium;
   a first driving mechanism configured to move the recording head in main scanning directions;
   a second driving mechanism configured to move the recording head and the recording medium with respect to each other in sub scanning directions perpendicular or substantially perpendicular to the main scanning directions;
   an input device configured to allow a user to input thereto printing information about printing time and image quality; and
   a control device configured and programmed to control the recording head, the first driving mechanism and the second driving mechanism based on the printing information input to the input device; wherein
   the printing information includes at least information about a pass number of the recording head;
   the input device is configured to allow the pass number to be changed continuously;
   where one direction among the main scanning directions is a forth direction and the other direction opposite to the one direction among the main scanning directions is a return direction, the control device is configured and programmed to perform unidirectional printing in which the ink is ejected from the recording head while the recording head is moving in the forth direction, and bidirectional printing in which the ink is ejected from the recording head both while the recording head is moving in the forth direction and while the recording head is moving in the return direction;
   the printing information includes information about the unidirectional printing and the bidirectional printing, information about a resolution of printing and information about a scanning speed, which is a moving speed of the recording head in the main scanning directions;
   the input device is configured to allow the unidirectional printing to be switched to the bidirectional printing and allow the bidirectional printing to be switched to the unidirectional printing; and
   the input device is configured to allow the resolution and the scanning speed to be changed continuously.

2. An inkjet printer according to claim 1, wherein the control device is configured and programmed to include:
   a receiving section configured to receive the printing information input to the input device;
   an image generation section configured to generate a printing preview image based on the printing information received by the receiving section; and
   an image display section configured to display the printing preview image, generated by the image generation section, on a display device.

3. An inkjet printer according to claim 2, wherein the control device is configured and programmed to include:
   a printing time calculation section configured to calculate the printing time necessary to perform printing on the recording medium based on the printing information input to the input device; and
   a printing time display section configured to display the printing time, calculated by the printing time calculation section, on the display device.

4. An inkjet printer according to claim 1, wherein:
   the input device is configured to allow the user to input a change in the printing information during printing on the recording medium by the recording head; and
   when the change in the printing information is input to the input device, the control device is configured to control the recording head, the first driving mechanism and the second driving mechanism based on the post-change printing information.

5. An inkjet printer according to claim 1, wherein the input device is configured to allow the pass number to be input as any integer.

6. An inkjet printer according to claim 1, wherein the input device is configured to allow the pass number to be changed at an interval of a predetermined numerical value.

7. An inkjet printer according to claim 1, wherein the input device is configured to allow the pass number to be changed at an interval of 1.

8. An inkjet printer according to claim 1, wherein the input device includes a slider control configured to set the pass number.

9. An inkjet printer according to claim 1, wherein the inkjet printer is a business-use printer.

10. An inkjet printer according to claim 1, wherein the input device is configured to allow the pass number to be changed during printing on the recording medium by the recording head.

* * * * *